US011640714B2

(12) United States Patent
Lee et al.

(10) Patent No.: US 11,640,714 B2
(45) Date of Patent: May 2, 2023

(54) VIDEO PANOPTIC SEGMENTATION

(71) Applicant: ADOBE INC., San Jose, CA (US)

(72) Inventors: Joon-Young Lee, San Jose, CA (US); Sanghyun Woo, Daejeon (KR); Dahun Kim, Daejeon (KR)

(73) Assignee: ADOBE INC., San Jose, CA (US)

( * ) Notice: Subject to any disclaimer, the term of this patent is extended or adjusted under 35 U.S.C. 154(b) by 412 days.

(21) Appl. No.: 16/852,647

(22) Filed: Apr. 20, 2020

(65) Prior Publication Data

US 2021/0326638 A1   Oct. 21, 2021

(51) Int. Cl.
*G06K 9/62* (2022.01)
*G06N 3/08* (2023.01)
*G06V 20/40* (2022.01)

(52) U.S. Cl.
CPC ........... *G06K 9/629* (2013.01); *G06K 9/6256* (2013.01); *G06K 9/6292* (2013.01); *G06N 3/08* (2013.01); *G06V 20/46* (2022.01); *G06V 20/49* (2022.01)

(58) Field of Classification Search
CPC ..... G06K 9/629; G06K 9/6256; G06K 9/6292
See application file for complete search history.

(56) References Cited

U.S. PATENT DOCUMENTS

2009/0244093 A1* 10/2009 Chen .................... G11B 27/034
                                                              345/620

2020/0050887 A1*  2/2020  Gautam ................... G06N 3/02
2020/0082219 A1*  3/2020  Li ......................... G06N 3/0454
2021/0158043 A1   5/2021  Hou et al.

OTHER PUBLICATIONS

Sergi Caelles, et al., "One-Shot Video Object Segmentation", Proceedings of the IEEE conference on computer vision and pattern recognition, pp. 221-230, 2017.
Kai Chen, et al., "MMDetection: Open MMLab Detection Toolbox and Benchmark", arXiv preprint arXiv:1906.07155, 2019, 13 pages.
Yuhua Chen, et al., Blazingly Fast Video Object Segmentation With Pixel-Wise Metric Learning, Proceedings of the IEEE Conference on Computer Vision and Pattern Recognition, pp. 1189-1198, 2018.
Jingchun Cheng, et al., "Segflow: Joint Learning for Video Object Segmentation and Optical Flow", Proceedings of the IEEE international conference on computer vision, pp. 686-695, 2017.
Marius Cordts, et al., "The Cityscapes Dataset for Semantic Urban Scene Understanding", Proc. of the IEEE Conference on Computer Vision and Pattern Recognition (CVPR), 2016, 11 pages.

(Continued)

*Primary Examiner* — Myron Wyche
(74) *Attorney, Agent, or Firm* — F. Chau & Associates, LLC

(57) ABSTRACT

Systems and methods for panoptic video segmentation are described. A method may include identifying a target frame and a reference frame from a video, generating target features for the target frame and reference features for the reference frame, combining the target features and the reference features to produce fused features for the target frame, generating a feature matrix comprising a correspondence between objects from the reference features and objects from the fused features; and generating panoptic segmentation information for the target frame based on the feature matrix.

20 Claims, 7 Drawing Sheets

(56) References Cited

OTHER PUBLICATIONS

Jifeng Dai, et al., "Deformable Convolutional Networks", pp. 764-773, 2017.
Daan de Geus, et al., "Panoptic Segmentation With a Joint Semantic and Instance Segmentation Network", arXiv preprint arXiv:1809.02110, 2018, 5 pages.
Daan de Geus, et al., "Single Network Panoptic Segmentation for Street Scene Understanding", arXiv preprint arXiv:1902.02678, 2019, 7 pages.
Christoph Feichtenhofer, et al., "Detect to Track and Track to Detect", Proceedings of the IEEE International Conference on Computer Vision, pp. 3038-3046, 2017.
Cheng-Yang Fu, et al., "IMP: Instance Mask Projection for High Accuracy Semantic Segmentation of Things", 2019, 10 pages.
Kaiming He, et al., "Mask R-CNN", Proceedings of the IEEE international conference on computer vision, pp. 2961-2969, 2017.
Kaiming He, et al., "Deep Residual Learning for Image Recognition", Proceedings of the IEEE conference on computer vision and pattern recognition, pp. 770-778, 2016.
Eddy Ilg, et al., "Flownet 2.0: Evolution of Optical Flow Estimation With Deep Networks", Proceedings of the IEEE conference on computer vision and pattern recognition, pp. 2462-2470, 2017.
Alexander Kirillov, et al., "Panoptic Feature Pyramid Networks", Proceedings of the IEEE Conference on Computer Vision and Pattern Recognition, pp. 6399-6408, 2019.
Alexander Kirillov, et al., "Panoptic Segmentation", Proceedings of the IEEE Conference on Computer Vision and Pattern Recognition, pp. 9404-9413, 2019.
Justin Lazarow, et al., "Learning Instance Occlusion for Panoptic Segmentation", arXiv preprint arXiv:1906.05896, 2019, 10 pages.
Jie Li, et al., "Learning to Fuse Things and Stuff", ArXiv preprint arXiv:1812.01192, 2018, 13 pages.
Qizhu Li, et al., "Weakly and Semi-Supervised Panoptic Segmentation", Proceedings of the European Conference on Computer Vision (ECCV), pp. 102-118, 2018.
Yanwei Li, et al., "Attention-Guided Unified Network for Panoptic Segmentation", Proceedings of the IEEE Conference on Computer Vision and Pattern Recognition, pp. 7026-7035, 2019.
Yule Li, et al., "Low-Latency Video Semantic Segmentation", Proceedings of the IEEE Conference on Computer Vision and Pattern Recognition, pp. 5997-6005, 2018.
Tsung-Yi Lin, et al., "Feature Pyramid Networks for Object Detection", pp. 2117-2125, 2017.
Tsung-Yi Lin, et al., "Microsoft COCO: Common Objects in Context", pp. 740-755. Springer, 2014.
Huanyu Liu, et al., "An End-to-End Network for Panoptic Segmentation", Proceedings of the IEEE Conference on Computer Vision and Pattern Recognition, pp. 6172-6181, 2019.
Gerhard Neuhold, et al., "The Mapillary Vistas Dataset for Semantic Understanding of Street Scenes", Proceedings of the IEEE International Conference on Computer Vision, pp. 4990-4999, 2017.
Seoung Wug Oh, et al., "Video Object Segmentation Using Space-Time Memory Networks", arXiv preprint arXiv:1904.00607, 2019, 10 pages.
Jiangmiao Pang, et al., "Libra R-CNN: Towards Balanced Learning for Object Detection", Proceedings of the IEEE Conference on Computer Vision and Pattern Recognition, pp. 821-830, 2019.
Adam Paszke, et al., "Automatic Differentiation in Pytorch", NIPS Autodiff Workshop, 2017, 4 pages.
Federico Perazzi, et al., "Learning Video Object Segmentation From Static Images", Proceedings of the IEEE Conference on Computer Vision and Pattern Recognition, pp. 2663-2672, 2017.
Lorenzo Porzi, et al., "Seamless Scene Segmentation", Proceedings of the IEEE Conference on Computer Vision and Pattern Recognition, pp. 8277-8286, 2019.
Stephan R Richter, et al., "Playing for Benchmarks", Proceedings of the IEEE International Conference on Computer Vision, pp. 2213-2222, 2017.

Evan Shelhamer, et al., "Clockwork Convnets for Video Semantic Segmentation", European Conference on Computer Vision, pp. 852-868. Springer, 2016.
Konstantin Sofiiuk, et al., "Adaptis: Adaptive Instance Selection Network", Proceedings of the IEEE International Conference on Computer Vision, pp. 7355-7363, 2019.
Pavel Tokmakov, et al., "Learning Video Object Segmentation With Visual Memory", Proceedings of the IEEE International Conference on Computer Vision, pp. 4481-4490, 2017.
Seoung Wug Oh, et al., "Fast Video Object Segmentation by Reference-Guided Mask Propagation", Proceedings of the IEEE Conference on Computer Vision and Pattern Recognition, pp. 7376-7385, 2018.
Yuwen Xiong, et al., "UPSNET: A Unified Panoptic Segmentation Network", Proceedings of the IEEE Conference on Computer Vision and Pattern Recognition, pp. 8818-8826, 2019.
Linjie Yang, et al., "Video Instance Segmentation", arXiv preprint arXiv:1905.04804, 2019, 10 pages.
Linjie Yang, et al., "Efficient Video Object Segmentation via Network Modulation", Proceedings of the IEEE Conference on Computer Vision and Pattern Recognition, pp. 6499-6507, 2018.
Tien-Ju Yang, et al., "Deeperlab: Single-Shot Image Parser", arXiv preprint arXiv:1902.05093, 2019, 20 pages.
Bolei Zhou, et al., "Semantic Understanding of Scenes Through the ADE20K Dataset", International Journal of Computer Vision, 127(3):302-321, 2019.
Xizhou Zhu, et al., "Flow-Guided Feature Aggregation for Video Object Detection", Proceedings of the IEEE International Conference on Computer Vision, pp. 408-417, 2017.
Xizhou Zhu, et al., "Deep Feature Flow for Video Recognition", Proceedings of the IEEE Conference on Computer Vision and Pattern Recognition, pp. 2349-2358, 2017.
Alexander Kirillov, et al., "Instancecut: From Edges to Instances With Multicut", Proc. of Computer Vision and Pattern Recognition (CVPR), 2017, pp. 5008-5017.
Andrew G Howard, et al., "Mobilenets: Efficient Convolutional Neural Networks for Mobile Vision Applications", arXiv preprint arXiv:1704.04861, 2017, 9 pages.
Anurag Arnab, et al., "Pixelwise Instance Segmentation With a Dynamically Instantiated Network", Proc. of Computer Vision and Pattern Recognition (CVPR), pp. 441-450, 2017.
Ashish Vaswani, et al., "Attention is All You Need", Proc. of Neural Information Processing Systems (NeurIPS), 2017, pp. 5998-6008.
Bharath Hariharan, et al., "Hypercolumns for Object Segmentation and Fine-Grained Localization", Proc. of Computer Vision and Pattern Recognition (CVPR), 2015, pp. 447-456.
Bharath Hariharan, et al., "Simultaneous Detection and Segmentation", Proc. of European Conf. on Computer Vision (ECCV), Springer, 2014, pp. 297-312.
Fisher Yu, et al., "Deep Layer Aggregation", Proc. of Computer Vision and Pattern Recognition (CVPR), 2018, pp. 2403-2412.
Fisher Yu, et al., "Multi-Scale Context Aggregation by Dilated Convolutions" Proc. of Int'l Conf. on Learning Representations (ICLR), 2015, 13 pages.
Forrest N Iandola, et al., "Squeezenet: Alexnet-Level Accuracy With 50X Fewer Parameters and 0.5 MB Model Size" arXiv preprint arXiv:1602.07360, 2016, 13 pages.
Hang Zhang, et al., "Co-Occurrent Features in Semantic Segmentation", Proc. of Computer Vision and Pattern Recognition (CVPR), 2019, pp. 548-557.
Hang Zhang, et al., "Context Encoding for Semantic Segmentation", Proc. of Computer Vision and Pattern Recognition (CVPR), 2018, pp. 7151-7160.
Hengshuang Zhao, et al. "Pyramid Scene Parsing Network", Proc. of Computer Vision and Pattern Recognition (CVPR), 2017, pp. 2881-2890.
Ho-Deok Jang, et al., "Propose-and-Attend Single Shot Detector", arXiv preprint arXiv:1907.12736, 2019, 10 pages.
Hongyang Li, et al., "Zoom Out-and-In Network With Map Attention Decision for Region Proposal and Object Detection", Int'l Journal of Computer Vision (IJCV), vol. 127, Springer, 2019, pp. 225-238.

(56) References Cited

OTHER PUBLICATIONS

Hsueh-Fu Lu, et al., "Toward Scale-Invariance and Position-Sensitive Region Proposal Networks", Proc. of European Conf. on Computer Vision (ECCV), 2018, pp. 168-183.
Huang Lang, et al., "Interlaced Sparse Self-Attention for Semantic Segmentation", arXiv preprint arXiv:1907.12273, 2019, 11 pages.
Hyeonwoo Noh, et al., "Learning Deconvolution Network for Semantic Segmentation", Proc. of Int'l Conf. on Computer Vision (ICCV), 2015, pp. 1520-1528.
Jiaqi Wang, et al., "Region Proposal by Guided Anchoring", Proc. of Computer Vision and Pattern Recognition (CVPR), 2019, pp. 2965-2974.
Jie Hu, Li Shen, et al., Squeeze-and-Excitation Networks, Proc. of Computer Vision and Pattern Recognition (CVPR), 2018, pp. 7132-7141.
Jifeng Dai, et al., "Convolutional Feature Masking for Joint Object and Stuff Segmentation", Proc. of Computer Vision and Pattern Recognition (CVPR), 2015, pp. 3992-4000.
Jifeng Dai, et al., "Instance-Aware Semantic Segmentation via Multi-Task Network Cascades", Proc. of Computer Vision and Pattern Recognition (CVPR), 2016, pp. 3150-3158.
Jonathan Long, et al., "Fully Convolutional Networks for Semantic Segmentation", Proc. of Computer Vision and Pattern Recognition (CVPR), 2015, pp. 3431-3440.
Jun Fu, et al., "Dual Attention Network for Scene Segmentation", Proc. of Computer Vision and Pattern Recognition (CVPR), 2019, pp. 3146-3154.
Liang-Chieh Chen, et al., "Deeplab: Semantic Image Segmentation With Deep Convolutional Nets, Atrous Convolution, and Fully Connected CRFS", IEEE Trans. Pattern Anal. Mach. Intell. (TPAMI), vol. 40, (2017), pp. 834-848.
Liang-Chieh Chen, et al., "Rethinking Atrous Convolution for Semantic Image Segmentation", Proc. of European Conf. on Computer Vision (ECCV), 2018, 14 pages.
Min Bai, et al., "Deep Watershed Transform for Instance Segmentation", Proc. of Computer Vision and Pattern Recognition (CVPR), 2017, pp. 5221-5229.
Olaf Ronneberger, et al., "U-Net: Convolutional Networks for Biomedical Image Segmentation", International Conference on Medical image computing and computer-assisted intervention, Springer, 2015, pp. 234-241.
Pedro O Pinheiro, et al., "Learning to Refine Object Segments", Proc. of European Conf. on Computer Vision (ECCV), Springer, 2016, pp. 75-91.
Pedro O Pinheiro, et al., "Learning to Segment Object Candidates", Proc. of Neural Information Processing Systems (NeurIPS), 2015, pp. 1990-1998.
Peter Shaw, et al., "Self-Attention With Relative Position Representations", arXiv preprint arXiv:1803.02155, 2018, 5 pages.
Qizhu Li, et al., "Weakly-and Semi-Supervised Panoptic Segmentation", Proc. of European Conf. on Computer Vision (ECCV), 2018, pp. 102-118.
Ross Girshick, "Fast R-CNN", Proc. of Int'l Conf. on Computer Vision (ICCV), 2015, pp. 1440-1448.
Ross Girshick, et al., "Rich Feature Hierarchies for Accurate Object Detection and Semantic Segmentation", Proc. of Computer Vision and Pattern Recognition (CVPR), 2014, pp. 580-587.
Shaoqing Ren, et al., "Faster R-CNN: Towards Real-Time Object Detection With Region Proposal Networks", Proc. of Neural Information Processing Systems (NeurIPS), 2015, pp. 91-99.
Shu Liu, et al., "Path Aggregation Network for Instance Segmentation", Proc. of Computer Vision and Pattern Recognition (CVPR), 2018, pp. 8759-8768.
Shu Liu, et al., "SGN: Sequential Grouping Networks for Instance Segmentation", Proc. of Int'l Conf. on Computer Vision (ICCV), 2017, pp. 3496-3504.
Shuai Li, et al., "Dynamic Anchor Feature Selection for Singleshot Object Detection", Proc. of Int'l Conf. on Computer Vision (ICCV), 2019, pp. 6609-6618.
Spyros Gidaris, et al., "Attend Refine Repeat: Active Box Proposal Generation via In-Out Localization", arXiv preprint arXiv:1606.04446, 2016, 25 pages.
Thang Vu, et al., "Cascade RPN: Delving Into High-Quality Region Proposal Network With Adaptive Convolution", Proc. of Neural Information Processing Systems (NeurIPS), 2019, 11 pages.
Tsung-Yi Lin, et al., "Focal Loss for Dense Object Detection", Proc. of Int'l Conf. on Computer Vision (ICCV), 2017, pp. 2980-2988.
XiaolongWang, et al., "Non-Local Neural Networks", Proc. of Computer Vision and Pattern Recognition (CVPR), 2018, pp. 7794-7803.
Xizhou Zhu, et al., "Deformable Convnets V2: More Deformable, Better Results", Proc. of Computer Vision and Pattern Recognition (CVPR), 2019, pp. 9308-9316.
Yi Li, et al., "Fully Convolutional Instance-Aware Semantic Segmentation", Proc. of Computer Vision and Pattern Recognition (CVPR), 2017, pp. 2359-2367.
Yue Wu, et al., "Rethinking Classification and Localization in R-CNN", arXiv preprint arXiv:1904.06493, 2019, 13 pages.
Yuwen Xiong, et al., "UPSNET: A Unified Panoptic Segmentation Network", Proc. of Computer Vision and Pattern Recognition (CVPR), 2019, pp. 8818-8826.
Zhaojin Huang, et al., "Mask Scoring R-CNN", Proc. of Computer Vision and Pattern Recognition (CVPR), 2019, pp. 6409-6418.
Zhen Zhu, et al., "Asymmetric Non-Local Neural Networks for Semantic Segmentation", Proc. of Int'l Conf. on Computer Vision (ICCV), 2019, pp. 593-602.
Zilong Huang, et al., "CCNET: Criss-Cross Attention for Semantic Segmentation", Proc. of Int'l Conf. on Computer Vision (ICCV), 2019, 10 pages.
First Action Interview Pilot Program Pre-Interview Communication dated Aug. 12, 2021 in related U.S. Appl. No. 16/849,716, filed Aug. 12, 2021.

* cited by examiner

VIDEO PANOPTIC SEGMENTATION

BACKGROUND

The following relates generally to image processing, and more specifically to video panoptic segmentation.

Computer vision tasks such as recognition, object classification, detection and segmentation may be unified into a single comprehensive task to leverage possible complementarity. For example, semantic segmentation may be a task for detecting all pixels in a scene, and instance segmentation may be a task to delineate objects in defined classes. "Panoptic Segmentation" involves both semantic segmentation and instance segmentation to detect and delineate both visible objects and regions in a scene.

Panoptic segmentation may also be applied to video. However, if a panoptic segmentation task is applied to frames of a video individually, the result may include inconsistencies between frames, and it may be computationally intensive. Therefore, there is a need in the art for systems and methods to perform video panoptic segmentation (VPS) efficiently and accurately.

SUMMARY

A method, apparatus, and non-transitory computer readable medium for video panoptic segmentation are described. Embodiments of the method, apparatus, and non-transitory computer readable medium may identify a target frame and a reference frame from a video, generate target features for the target frame and reference features for the reference frame, combine the target features and the reference features to produce fused features for the target frame, generate a feature matrix comprising a correspondence between objects from the reference features and objects from the fused features, and generate panoptic segmentation information for the target frame based on the feature matrix.

A method, apparatus, and non-transitory computer readable medium for video panoptic segmentation are described. Embodiments of the method, apparatus, and non-transitory computer readable medium may identify a training set comprising a plurality of video clips and original panoptic segmentation information for each of the plurality of video clips, identify a target frame and a reference frame for each of the plurality of video clips, generate target features for the target frame and reference features for the reference frame, combine the target features and the reference features to produce fused features for the target frame, generate a feature matrix comprising a correspondence between objects from the reference features and objects from the fused features, generate predicted panoptic segmentation information for the target frame based on the feature matrix, compare the predicted panoptic segmentation information to the original panoptic segmentation information, and update the ANN based on the comparison.

An apparatus and method for video panoptic segmentation are described. Embodiments of the apparatus and method may include an encoder configured to generate target features for a target frame and reference features for a reference frame of a video, a fusion component configured to combine the target features and the reference features to produce fused features for the target frame, a track head configured to generate a feature matrix comprising a correspondence between objects from the reference features and objects from the fused features, a semantic head configured to classify each pixel of the target frame based on the fused features, and a segmentation component configured to generate panoptic segmentation information for the target frame based on the feature matrix and the classification of each pixel of the target frame.

DETAILED DESCRIPTION

The present disclosure relates generally to video panoptic segmentation (VPS). Panoptic segmentation refers to the holistic identification of pixel classification (i.e., semantic segmentation) and object boundary information (i.e., instance segmentation) in an image. VPS performs panoptic segmentation on a video. In some embodiments, a deep artificial neural network (ANN) is applied to the panoptic segmentation task.

In some examples of panoptic segmentation, semantic segmentation and instance segmentation are performed using separately trained neural networks, and the results are combined using heuristic rules or algorithms. In other examples, a unified network is trained to perform both tasks simultaneously. In either case, applying a conventional panoptic segmentation network to individual frames of a video may result in time inconsistencies.

Figure 3:
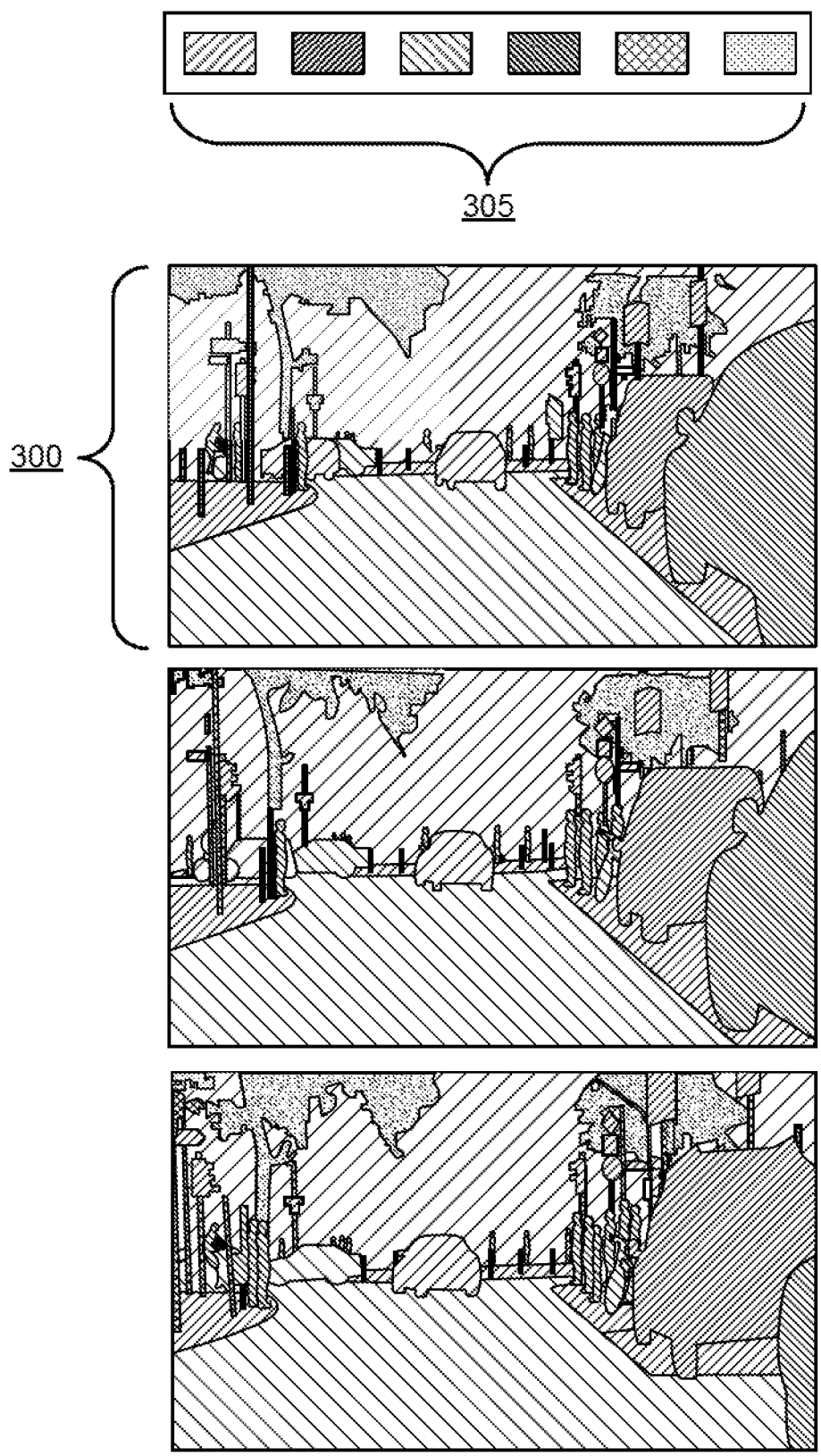
FIG. 3 shows an example of annotated video frames according to aspects of the present disclosure.

For example, a video of a city environment may include multiple people, vehicles, and other objects as illustrated in FIG. 3. If a conventional image panoptic segmentation network is applied to each frame independently, an object such as a vehicle or a person may be misidentified or identified in each frame differently. That is, pixels depicting a vehicle may be correctly identified in a first frame, and incorrectly identified in a second frame. In other cases, the vehicle may be identified as such in both frames, but the system may not assign the same object identity to the vehicle in the difference frames.

Therefore, embodiments of the present disclosure perform VPS by identifying a target frame and one or more reference frames from a video. An encoder generates features for the target frame and for the reference frame. The target features and the reference features are aligned and combined using a spatial-temporal attention module. The combined features from the target frame and the reference frames may be used to generate both instance segmentation information and semantic segmentation information, which is then combined to create panoptic segmentation information for the target frame. By incorporating the reference frames when determining the panoptic segmentation information for each target frame, the results are accurate and timing is consistent.

The following terms are used throughout the disclosure:

The term "panoptic segmentation information" refers to the combination of instance segmentation information and semantic segmentation information. Panoptic segmentation is well suited for image processing and for use such as in a computer vision task.

The term "instance segmentation" refers to the identification of object boundaries in an image. For example, each object (including background textures) in an image may be associated with an object mask that identifies the limits of the object.

The term "semantic segmentation information" refers to the identification of a semantic classification for each pixel of an image. For example, each pixel may be associated with one or more values representing the likelihood that the pixel corresponds to one of a set objects present in the image.

The term "video panoptic segmentation (VPS)" refers to the task of performing panoptic segmentation on the frames of a video.

The term "target frame" refers to an image frame of a video that is currently being processed. For example, a neural network may be used to predict panoptic segmentation for the target frame based on the target frame itself and one or more reference frames.

The term "reference frame" refers to an image frame of a video that is used together with a target frame to generate time-consistent segmentation information for the target frame. For example, the reference frame could be a frame immediately prior to (or following) the target frame in a sample of frames from a video.

The term "target features" and "reference features" refer to encoded features derived from a target frame or a reference frame, respectively. In some cases, the target features from one frame may be stored and used as reference features for determining segmentation information for a subsequent frame.

The term "fused features" refers to a combination of the target features and the reference features that is used to generate panoptic segmentation information for a target frame. For example, the reference features may be warped to align the objects with those of the target frame, and a spatial-temporal attention module may be applied to the warped reference features and the target features to produce the fused features.

The term "feature matrix" refers to a matrix representing a correspondence between regions of interest (RoIs) for objects in the reference image and objects from the fused features. Thus, the feature matrix may be used to identify instances of objects in the reference frame and the target frame, which provides time consistency between frames in a video.

System Overview

Figure 1:
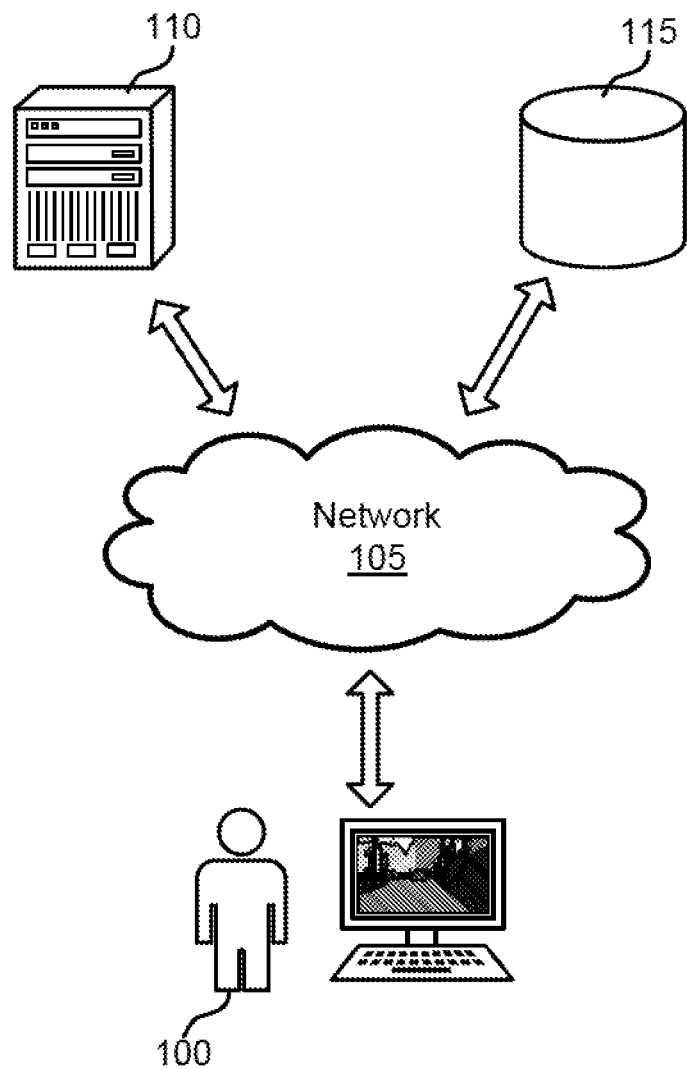
FIG. 1 shows an example of a system for video panoptic segmentation according to aspects of the present disclosure.

FIG. 1 shows an example of a system for video panoptic segmentation according to aspects of the present disclosure. The example shown includes user 100, network 105, server 110, and database 115. The user 100 may provide a video to the server 110 via the network 105. The server 110 may then provide panoptic segmentation information for the video (e.g., in the form of annotation information associated with each frame or a sample of frames of the video).

Embodiments of the present disclosure describe a video extension of visual recognition task that unifies semantic segmentation and instance segmentation tasks. The video-related visual recognition task may be referred to as video panoptic segmentation. Video panoptic segmentation may generate consistent panoptic segmentation as well as associate instance Identification information across video frames.

Based on the nature of video panoptic segmentation tasks, temporal inconsistency in class labels and instance IDs may result in low video quality of panoptic segmentation sequences. Therefore, more strict standards may be used for "thing" (i.e., object) classes compared to "stuff" (i.e., background, material, or texture) classes. Video context may be used on two levels: pixel level and object level. In some examples, neighboring frame features (i.e., reference frames) may be leveraged for both downstream multi-task branches. One embodiment includes explicitly modeling cross-frame instance association specifically for object tracking. Thus, a module for feature fusion (i.e., a Fuse module) and a module for object tracking (i.e., a Track module) may be jointly used for video panoptic segmentation.

In some examples, the server 110 performs the VPS task using an artificial neural network (ANN) trained using a custom dataset. Embodiments may include a VPS ANN which jointly predicts object classes, bounding boxes, masks, instance ID tracking, and semantic segmentation in video frames.

An ANN is a hardware or a software component that includes a number of connected nodes (a.k.a., artificial neurons), which may loosely correspond to the neurons in a human brain. Each connection, or edge, may transmit a signal from one node to another (like the physical synapses in a brain). When a node receives a signal, it can process the signal and then transmit the processed signal to other connected nodes. In some cases, the signals between nodes comprise real numbers, and the output of each node may be computed by a function of the sum of its inputs. Each node and edge may be associated with one or more node weights that determine how the signal is processed and transmitted.

During the training process, these weights may be adjusted to improve the accuracy of the result (i.e., by minimizing a loss function which corresponds in some way to the difference between the current result and the target result). The weight of an edge may increase or decrease the strength of the signal transmitted between nodes. In some cases, nodes may have a threshold below which a signal is not transmitted at all. The nodes may also be aggregated into layers. Different layers may perform different transformations on their inputs. The initial layer may be known as the input layer and the last layer may be known as the output layer. In some cases, signals may traverse certain layers multiple times.

A convolutional neural network (CNN) is an ANN characterized by the use of convolutional (or cross-correlational) hidden layers. These layers apply a convolution operation to the input before signaling the result to the next layer. Each convolutional node may process data for a limited field of input (i.e., the receptive field). During a forward pass of the CNN, filters at each layer may be convolved across the input volume, computing the dot product between the filter and the input. During the training process, the filters may be modified so that they activate when they detect a particular feature within the input.

However, a standard CNN may not be suitable when the length of the output layer is variable, i.e., when the number of the objects of interest is not fixed. Furthermore, the objects of interest (i.e., the chart elements) can have different locations within the image, and may have different aspect rations. Selecting a large number of regions to analyze using conventional CNN techniques may result in computational inefficiencies. Thus, in the R-CNN approach, a finite number of proposed regions are selected and analyzed.

Fast R-CNN and Faster R-CNN provide solutions for speeding up an R-CNN. Fast R-CNN provides the original input image to the CNN to generate a feature map. From the feature map, it identifies region proposals, warps them into squares with a fixed size so they can be input into a fully connected layer. Thus, the convolution is done only once. In Faster R-CNN, a separate network is used to predict region proposals (i.e., instead of using a selective search algorithm on the feature map). The predicted region proposals are then reshaped and classified using a region-of-interest (RoI) pooling layer.

A Mask R-CNN is another deep neural network incorporating concepts of the R-CNN. Given an image as input, the Mask R-CNN provides object bounding boxes, classes and masks (i.e., sets of pixels corresponding to object shapes). A Mask R-CNN operates in two stages. First, it generates potential regions (i.e., bounding boxes) where an object might be found. Second, it identifies the class of the object, refines the bounding box and generates a pixel-level mask in pixel level of the object. These stages may be connected using a backbone structure such as a feature pyramid network (FPN).

A Spatial Attention Network (SAN) is a variant of a CNN designed to exploit the spatial context of images. A SAN utilizes attention weights for clustered regional features. The attention weights indicate the value of the contribution of different regions to the overall classification. In some cases, an SAN uses a weighted sum of regional features as discriminative features. Thus, an SAN draws attention to important contents by giving them a higher attention weight.

A ResNet is a neural network architecture that addresses issues associated with training deep neural networks. It operates by including identity shortcut connections that skip one or more layers of the network. In a ResNet, stacking additional layers doesn't degrade performance or introduce training errors because skipping layers avoids the vanishing gradient problem of deep networks. In other words, the training gradient can follow "shortcuts" through the deep network. In some cases, a ResNet may be used for feature extraction.

Example embodiments employ a Mask R-CNN and deformable convolutions for instance and semantic segmentation branches, respectively. A panoptic head may combine the two branches. Certain embodiments do not use unknown class prediction.

Embodiments of the present disclosure may utilize training datasets designed for video panoptic segmentation tasks. Datasets for training the server 110 may be stored in database 115. In one embodiment, a dataset is created from re-organizing a synthetic VIPER dataset into video panoptic format to exploit the VIPER's large-scale pixel annotations. In another embodiment, a dataset is created from temporal extension on the Cityscapes validation set, by adding video panoptic annotations.

A video panoptic quality (VPQ) evaluation metric is described which may be used to evaluate the described methods and networks. Experiments demonstrate the effectiveness of the described datasets. The systems and methods described herein may achieve improved results in image panoptic quality (PQ) on a variety of datasets such as the Cityscapes dataset, and in VPQ on Cityscapes-VPS dataset and VIPER dataset.

Figure 2:
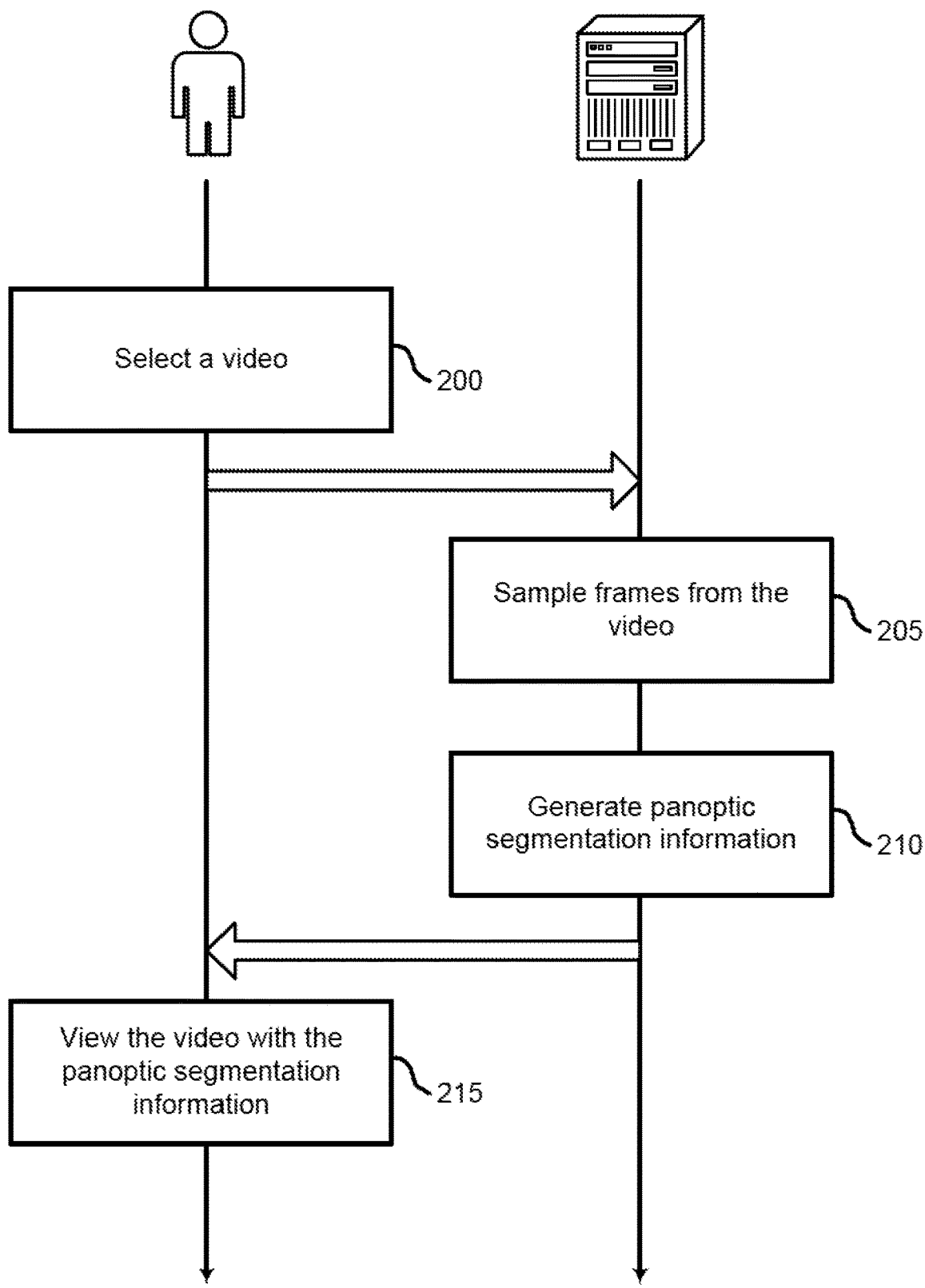
FIG. 2 shows an example of a process for video panoptic segmentation according to aspects of the present disclosure.

FIG. 2 shows an example of a process for video panoptic segmentation according to aspects of the present disclosure. In some examples, these operations may be performed by a system including a processor executing a set of codes to control functional elements of an apparatus. Additionally or alternatively, the processes may be performed using special-purpose hardware. Generally, these operations may be performed according to the methods and processes described in accordance with aspects of the present disclosure. For example, the operations may be composed of various sub-steps, or may be performed in conjunction with other operations described herein.

At operation 200, a user selects a video. For example, the video may represent one or more objects moving with respect to various background features.

At operation 205, the system samples frames from the video. In some cases, each frame of the video is selected. In other cases, a subset of frames is selected, which may be separated by regular time intervals. In some cases, the operations of this step may be performed by a server as described with reference to FIG. 1.

At operation 210, the system generates panoptic segmentation information. Video panoptic segmentation may perform simultaneous prediction of object classes, bounding boxes, masks, instance ID associations, and semantic segmentation, while assigning unique answers to each pixel in a video. Thus, embodiments of the present disclosure extend a panoptic segmentation from image domains to video domains. In some cases, the operations of this step may be performed by a server as described with reference to FIG. 1.

At operation 215, the user views the video with the panoptic segmentation information. Although FIG. 2 describes an example in which the VPS information is used directly by a user, VPS may also be used in various other applications that utilize a holistic and global view of video segmentation such as autonomous driving, augmented reality, and video editing. Further, temporally dense panoptic segmentation of a video may function as intermediate level representations for even higher-level video understanding tasks. For example, these video understanding tasks may include temporal reasoning or action-actor recognition which may anticipate behaviors of objects and humans.

Video Panoptic Segmentation

FIG. 3 shows an example of annotated video frames 300 according to aspects of the present disclosure. The example shown includes frames 300 and segmentation information 305.

The frames 300 may represent scenes from a video that are separated by a time difference. In some cases, they represent consecutive frames of a video, and in other cases they represent a sample of frames form the video that are not consecutive. The segmentation information 305 in each frame may be visualized as a coloring, shading, or otherwise indicating object classification and instance information. For example, vehicles may be represented differently from humans, but also each vehicle may be represented differently.

Segmentation information 305 may include video panoptic segmentation (VPS) information. Panoptic segmentation refers to the joint task of object and material segmentation that combines semantic segmentation task and instance segmentation task. In some cases, each of the two sub-tasks may be trained separately and then fuse the results by heuristic rules. Another approach is to present a unified end-to-end model.

In video semantic segmentation (VSS), all pixels in a video may be predicted as different semantic classes. In some cases, algorithms may obtain temporally dense annotation. In one example, temporal information is utilized via optical flow to improve accuracy or efficiency of the scene labeling performance. Video semantic segmentation may not include either discriminating object instances or explicit tracking of the objects across frames.

In video instance segmentation (VIS), image instance segmentation information is applied to video. VIS combines multiple tasks including video object segmentation and video object detection. VIS conducts simultaneous detection, segmentation, and tracking of instances in a video. In one example, Mask-Track R-CNN adds a tracking branch to the Mask R-CNN to jointly learn these multiple tasks. The object association is trained based on object feature similarity learning, and the learned features are used together with other cues such as spatial correlation and detection confidence to track objects at inference. In some cases, VIS may only process foreground thing objects and may not process background stuff regions. Moreover, VIS may allow overlapping between the predicted object masks and multiple predictions for a single instance.

In some examples of VPS, mask level attention is leveraged to transfer knowledge from an instance head to a semantic head. In some cases, an objective function enforces consistency between things and stuff pixels when merging them into a single segmentation result. In some cases, a spatial ranking module may be used to address the occlusion between the predicted instances. In some cases, a non-parametric panoptic head is described to predict instance ID and resolve conflicts between things and stuff segmentation.

Panoptic segmentation benchmarks include COCO, Cityscapes, and Mapillary. Unlike panoptic image segmentation, the counterpart video domains may not have appropriate datasets or evaluation metrics. For example, no available datasets permit direct training of video panoptic segmentation. In addition, cost of collecting such training data may be extremely high. Embodiments of the present disclosure create datasets suitable for video panoptic segmentation. In one embodiment, a synthetic VIPER dataset is adapted into video panoptic format and corresponding metadata is created. In another embodiment, a video panoptic segmentation dataset is collected that may extend the Cityscapes dataset to video level by providing every pixel-level panoptic labels that are temporally associated with respect to the public image-level annotations. In some examples, these labels can be provided for a subset of the video frames (e.g., every fifth frame).

In addition, embodiments of the present disclosure implement a video panoptic segmentation network that works as a baseline method for video panoptic segmentation tasks. Building upon image panoptic segmentation, the described network may take an additional frame as a reference to correlate time information at two levels—pixel level fusion and object level tracking. In one embodiment, to extract complementary feature points in a reference frame, a flow-based feature map alignment module along with an asymmetric attention block, computes similarities between the target and reference features to fuse them into one-frame shape. In another embodiment, to associate object instances across time, an object track head is added to learn the correspondence between the instances in the target and reference frames based on their RoI feature similarity. The described network may become a baseline for video panoptic segmentation tasks.

A standard image panoptic quality (PQ) metric may be adapted to fit the video panoptic quality (VPQ) format. The PQ metric is obtained from a span of several frames, where the sequence of each panoptic segment within the span is considered a single 3D tube prediction to produce an IoU with a ground truth tube. The longer the time-span, the more difficult it is to obtain IoU over a threshold, and to be counted as a true-positive for the final VPQ score. The described network is evaluated against some baselines using a VPQ metric. Further detail regarding the evaluation of a VPS network is described below with reference to FIG. 4.

According to various embodiments, a dataset may be designed by re-formatting the virtual VIPER dataset and creating new video panoptic labels based on the Cityscapes benchmark, respectively. Both datasets may be complementary in constructing an accurate video panoptic segmentation model. The described network may achieve good image panoptic quality PQ on Cityscapes and VIPER datasets. One embodiment of the present disclosure describes a VPQ metric that can measure the spatial-temporal consistency of predicted and ground truth panoptic segmentation masks. Evaluating a VPQ metric demonstrates the effectiveness of the described datasets and methods.

Figure 4:
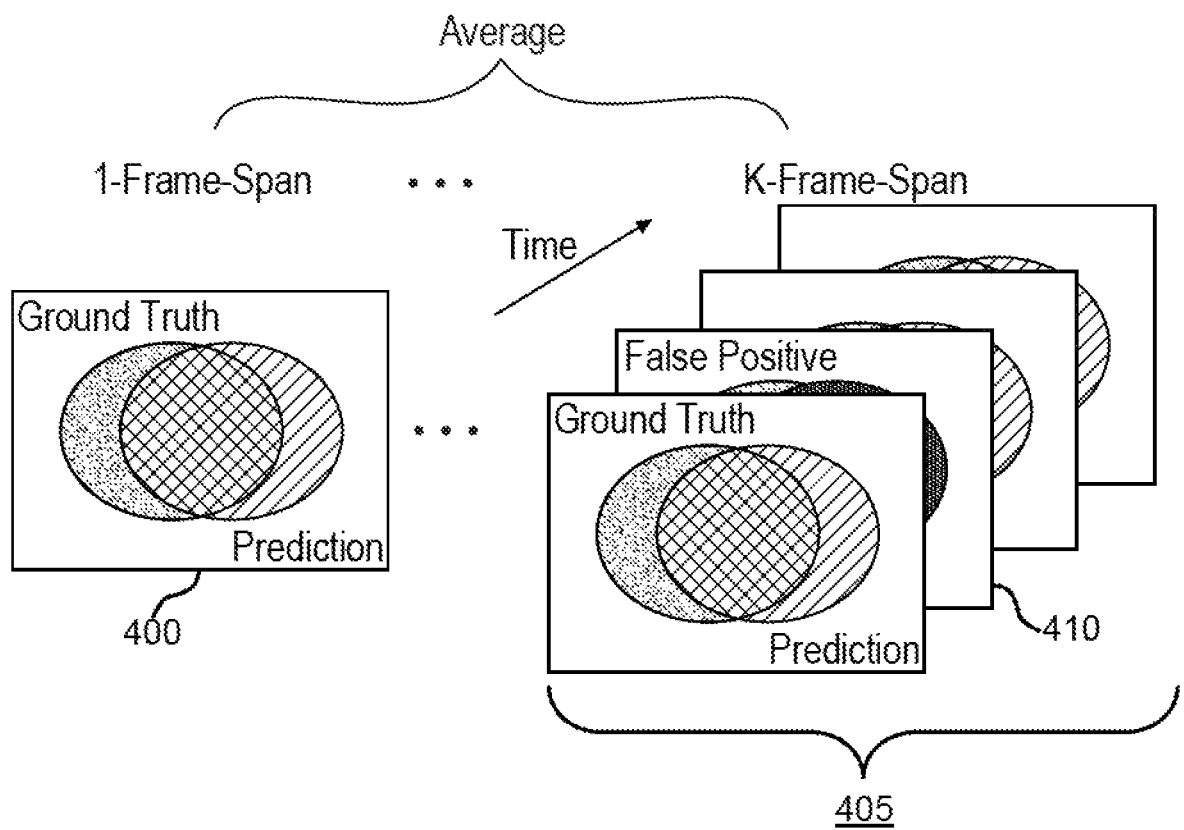
FIG. 4 shows an example of a span of video frames according to aspects of the present disclosure.

FIG. 4 shows an example of a span of video frames 410 according to aspects of the present disclosure. The example shown includes single frame span 400 and multiple frame span 405. Multiple frame span 405 may include one or more frames 410. In some cases, different span lengths may be used to determine the quality of panoptic segmentation information (e.g., whether objects are correctly classified, and whether instances are consistent between frames).

The quality of panoptic segmentation information may be reduced if pixels are misclassified, if objects boundaries are incorrect, or if false positives emerge in one or more frames 410. According to embodiments of the present disclosure, VPS learning may improve per-frame panoptic quality (PQ) by properly utilizing spatial-temporal features. The described methods may be evaluated on PQ, video panoptic quality (VPQ), recognition quality (RQ), and segmentation quality (SQ) metrics.

Measures of the quality for embodiments of the present disclosure may be conducted on datasets including the VIPER and Cityscapes-VPS, as well as the image-level Cityscapes benchmark. The results may involve two aspects: image-level prediction and cross-frame association, which may be reflected in the PQ and VPQ.

In some cases, overlapping may not be possible among video tubes in video panoptic segmentation. Hence, a standard average precision (AP) metric used in object detection or instance segmentation may not evaluate video panoptic segmentation tasks. Instead, a panoptic quality (PQ) metric in image panoptic segmentation may be adapted to the video domain. Given a set of predicted and ground truth segments, a PQ metric splits segments into three sets—true positives (TP), false positives (FP), and false negatives (FN). The three sets may represent matched pairs of segments, unmatched predicted segments, and unmatched ground truth segments, respectively. A PQ score is rewarded by average the intersection-over-union (IoU) score and the ratio of the TP set, and penalized by the ratio of the FP and FN sets.

One embodiment of the present disclosure describes a VPQ metric as a video extension of an image-level PQ metric and considers matching of video tubes. Given a video sequence with T frames, a temporal window is set to include $k (\leq T)$ consecutive frames to compute an IoU score. Given a ground truth tube $U_c$ and a predicted tube $\hat{U}_c$ for a given class c, the VPQ metric collects a set of TP matches as $TP_c = \{(u, \hat{u}) \in U_c \times \hat{U}_c : \text{IoU}(u, \hat{u}) \geq 0.5\}$. The VPQ metric for class c is given below:

$$VPQ_c^k = \frac{\sum_{(u,\hat{u}) \in TP_c} \text{IoU}(u, \hat{u})}{|TP_c| + \frac{1}{2}|FP_c| + \frac{1}{2}|FN_c|}.$$

According to embodiments of the present disclosure, any cross-frame inconsistency of semantic or instance label prediction may result in a low tube IoU, and may drop a whole sequence of predicted segments out of the TP set. Therefore, the larger a window size is, the more difficult it is to obtain a high VPQ score. A window slides throughout T frames and VPQ scores are averaged. When a window size k is 1, the VPQ metric is equivalent to an image-level PQ metric. K different window sizes are used and an average of k values produces a final VPQ score. In one example, $k \in \{1, 5, 10, 15\}$ and K=4 for evaluation. The VPQ metric computes the spatial-temporal consistency of predicted and ground truth segmentation.

$$VPQ = \frac{1}{CK} \sum_k \sum_c VPQ_c^k$$

Quality contributions may come from each of the described pixel-level Fuse and object-level Track modules. According to one example, dataset splits used in experiments may be based on VIPER, Cityscapes, and Cityscapes-VPS datasets. VIPER has high quantity and quality of panoptic video annotation. In one example, public training and validation splits are used. For evaluation purpose, 10 validation videos from day scenario may be chosen, and the first 60 frames of each video may be used, which amount to a total of 600 images.

For the Cityscapes dataset, public training and validation splits may also be used, and an image-level model may be evaluated on the validation set. For Cityscapes-VPS, the video panoptic annotations may have 500 validation videos from the Cityscapes. In one example, 500 videos may be split into 400 training videos and 100 validation videos. Each video may have 30 consecutive frames, with every 5 frames paired with the ground truth annotations. For each video, all 30 frames may be predicted, and only the 6 frames with ground truth may be evaluated.

Therefore, embodiments of the present disclosure can improve performance using Fuse and Track modules on image-level panoptic segmentation. Both pixel-level and object-level modules have complementary contributions and each described module may improve the baseline by +1% PQ. Without either of the modules, PQ may drop by 3.4%.

The results of various embodiments may be seen using the Cityscapes benchmark in comparison with the panoptic segmentation methods. For example, an embodiment with only the Fuse module may be trained using a neighboring reference frame without any extra annotations. An embodiment with the Fuse module outperforms baseline by 1.0% PQ by effectively exploiting spatial-temporal context to improve per-frame panoptic segmentation. Pre-training on the VIPER dataset shows complementary effectiveness to either the COCO or the Cityscapes dataset by improving the PQ score by 1.6% to 62.6% from baseline.

Another embodiment that includes only the tracking branch of the described network. Alternative tracking methods include object sorting by classification logit values (Cls-Sort), and flow-guided object matching by mask IoU (IoU-Match). Cls-Sort may rely on semantic consistency of the same object between frames. However, Cls-Sort may fail to track objects possibly because there are a number of instances of the same class in a frame (e.g., car, person), thus making the class logit information insufficient for differentiating these instances. On the other hand, IoU-Match leverages spatial correlation to determine the instance labels, improving an image-level baseline model by, for example, 9.7% VPQ. Embodiments including the Track module may improve an image-level baseline model by +1.2% VPQ by using a learned RoI feature matching algorithm together with semantic consistency and spatial correlation cues.

Embodiments that include both the Fuse and Track modules described herein may achieve an improvement of 6.1% VPQ over a variant model with only the Track module, and 17.0% over the image-level baseline model. To illustrate the contribution of the fused feature solely on object matching performance, in one embodiment, a fused feature is fed to all task branches except for the tracking branch (disjoined). The results show that the Fuse and Track modules may share information, and may synergize each other to learn more discriminative features for both segmentation and tracking. Experiments on Cityscapes-VPS dataset show consistent results. For example, an embodiment including both the Fuse and Track modules achieves 2.5% VPQ score higher than the Track variant.

In some cases, performance of the video instance tracking algorithm and the described network drops when temporal length increases. In the context of video, when handling a large number of instances, modeling the temporal information can resolve overlaps between these objects. The mutual exclusiveness between "things" (i.e., objects) and "stuff" (i.e. background texture or material) class pixels may be further exploited to encourage both semantic segmentation and instance segmentation to regularize each other. In some cases, key frames are sampled and information propagated to produce temporally dense panoptic segmentation results.

Network Architecture

Figure 5:
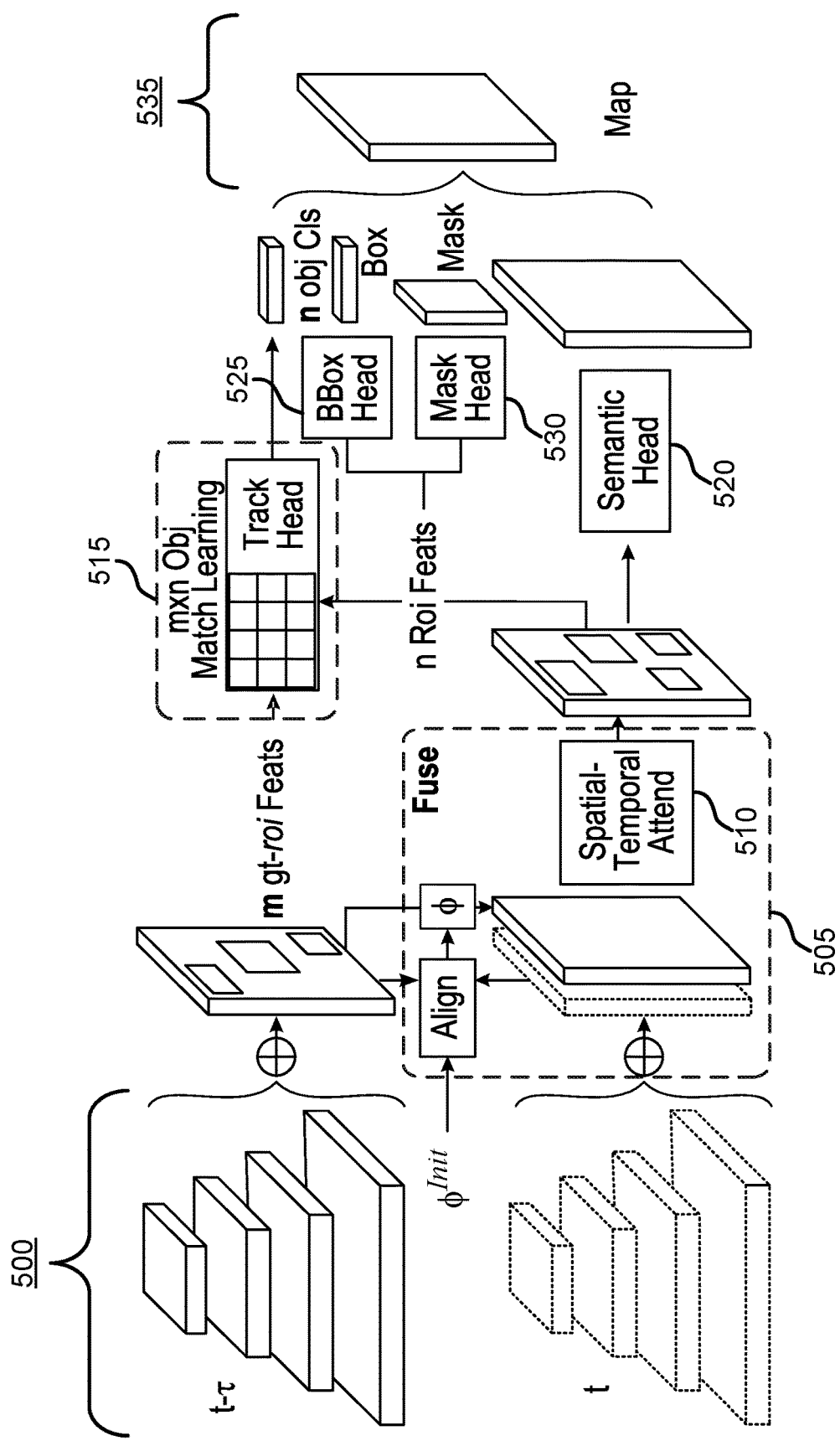
FIG. 5 shows an example of an apparatus for panoptic video segmentation according to aspects of the present disclosure.

FIG. 5 shows an example of an apparatus for panoptic video segmentation according to aspects of the present disclosure. The example shown includes encoder 500, fusion component 505, track head 515, semantic head 520, bounding box head 525, mask head 530, and segmentation component 535.

Unlike static images, videos have rich temporal and motion context information. A video panoptic segmentation model can use this information to capture panoptic movement of all things and stuff classes in a video. Embodiments of the present disclosure describe a VPS network. Given an input video sequence, the described network may perform object detection, mask prediction, tracking, and semantic segmentation simultaneously.

Encoder 500 may generate target features for the target frame and reference features for the reference frame. Encoder 500 may also combine a set of input features to produce the target features, where each of the set of input features has a different resolution, and where the target features have a same resolution as the target frame. In an example embodiment, the ResNet-50 FPN as a feature extractor.

According to various embodiments, L predefined semantic classes may be encoded as $L := \{0, \ldots, L-1\}$. Given a video sequence with T frames, there may be N objects in the video. The present disclosure may use panoptic segmentation to map each pixel i of the video to a tuple $(l_i, z_i) \in L \times N$, where $l_i$ represents a semantic class of a pixel i and $z_i$ represents the pixel's instance ID. For video panoptic segmentation, a unique tuple prediction to each pixel may be assigned. All pixels in the video may be grouped by the tuple, and may result in a set of stuff and things segment tracks that are mutually exclusive to each other. These tracks of segments may be referred to as the video "tubes." Ground truth annotations may be encoded identically. Video panoptic segmentation may reduce the difference between a ground truth and a prediction. Video panoptic segmentation may be able to accurately localize all the semantic and instance boundaries throughout a video, and assign correct labels to the described segmented video tubes.

Fusion component 505 (or Fuse module) combines the target features and the reference features to produce fused features for the target frame. Fusion component 505 may also align the reference features with the target features, where the fused features are combined based on the aligned reference features.

Fusion component 505 may include spatial-temporal attention module 510. In some examples, combining the target features and the reference features includes applying a spatial-temporal attention module 510 to the target features and the reference features.

Embodiments of the present disclosure leverage video context to improve the per-frame feature by temporal feature fusion. At each time step t, encoder 500 is given a target frame $I_t$ and one (or more) reference frame(s) $I_{t-\tau}$ produces FPN features $\{p^2, p^3, p^4, p^5\}_t$ and $\{p^2, p^3, p^4, p^5\}_{t-\tau}$. The reference frame is sampled with $\tau \in \{t-5:t+5\}$.

Some embodiments of the described network have a non-parametric neck layer which uses balanced semantic features to enhance a pyramidal neck representations. A representative feature map may be implemented at a single resolution level. Therefore, the extra neck may have "gather" and "redistribute" steps with no additional parameters. At the gather step, input FPN features $\{p^2, p^3, p^4, p^5\}$ are resized to the highest resolution, i.e., the same size as $p^2$, and element-wise summed over multiple levels to produce f. Then, the representative features are redistributed to the original features by a residual addition.

In one embodiment, an align-and-attend pipeline is implemented between the gather and redistribute steps. Given the gathered features $f_t$ and $f_{t-\tau}$, the align module learns flow warping to align the reference feature $f_{t-\tau}$ onto the target feature $f_t$. The align module receives an initial optical flow $\emptyset_{t \to t-\tau}^{init}$, and refines it for a more accurate deep feature flow. After concatenating these aligned features, the attend module learns spatial-temporal attention to re-weight the features and fuse the time dimension into a single dimension to obtain $g_t$. Then, $g_t$ is redistributed to $\{p^2, p^3, p^4, p^5\}_t$ which are then fed forward to a downstream instance and semantic branches (e.g., track head 515 and semantic head 520).

Track head 515 (or Track module) may generate a feature matrix including a correspondence between objects from the reference features and objects from the fused features. Track head 515 may also identify an object order for the objects from the fused features based on the feature matrix, where the panoptic segmentation is based on the object order. Track head 515 may also classify each of the objects from the fused features.

Tracking at object level may be used to track all object instances in $I_t$ with respect to those in $I_{t-\tau}$. Along with multi-task heads for panoptic segmentation, the described network may add a MaskTrack head from video instance segmentation. It may learn an m×n feature affinity matrix A between generated n RoI proposals $\{r_1, r_2 \ldots r_n\}_t$ from $I_t$ and m RoI features $\{r_1, r_2 \ldots r_m\}_{t-\tau}$ from $I_{t-\tau}$. For each pair $\{r_{i,t}, r_{j,t-\tau}\}$, a Siamese fully-connected layer may embed them into single vectors $\{e_{i,t}, e_{j,t-\tau}\}$. Cosine similarity is measured as:

$$A_{ij} = \text{cosine}(e_{i,t}, e_{j,t-\tau}).$$

Since MaskTrack is designed for still images, it may utilize only image features, and not any video features during training. However, the described network may couple the tracking branch with a temporal fusion module. All the RoI features $\{r_1, r_2 \ldots r_n\}_t$ may be enhanced by the temporal fused feature, $g_t$, from multiple frames, and thus become more discriminative before being fed into the tracking branch. Therefore, the described network may synchronize instance tracking on both pixel-level and object-level. The pixel-level module may align local features of the instance to transfer them between the reference and target frames, and the object-level module may focus more on distinguishing the target instance from other reference objects by a similarity function on temporally augmented RoI features. During inference stage, an additional cue from the panoptic head, IoU of things logits, is added. The IoU of instance logits may be viewed as a deformation factor or spatial correlation between frames.

Semantic head 520 may classify each pixel of the target frame based on the fused features. Bounding box head 525 may identify a bounding box for each of the objects from the fused features. Mask head 530 may generate a pixel mask for each of the objects from the fused features.

Segmentation component 535 may generate panoptic segmentation information for the target frame based on the feature matrix. In some examples, the panoptic segmentation information includes classification information and instance information for each pixel of the target frame. In some examples, the panoptic segmentation information is generated based on an object order for the objects from the fused features, an object classification for each of the objects from the fused features, a pixel mask for each of the objects from the fused features, and a pixel classification for each pixel of the target frame.

In some cases, the apparatus may include a processor and a memory. A processor may include an intelligent hardware device, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or any combination thereof). In some cases, the processor may be configured to operate a memory array using a memory controller. In other cases, a memory controller may be integrated into processor. The processor may be configured to execute computer-readable instructions stored in a memory to perform various functions. In some examples, a processor may include special purpose components for modem processing, baseband processing, digital signal processing, or transmission processing. In some examples, the processor may comprise a system-on-a-chip.

A computer memory may store information for various programs and applications on a computing device. For example, the storage may include data for running an operating system. The memory may include both volatile memory and non-volatile memory. Volatile memory may include random access memory (RAM), and non-volatile memory may include read-only memory (ROM), flash memory, electrically erasable programmable read-only memory (EEPROM), digital tape, a hard disk drive (HDD), and a solid state drive (SSD). Memory may include any combination of readable and/or writable volatile memories and/or non-volatile memories, along with other possible storage devices.

Inference

Figure 6:
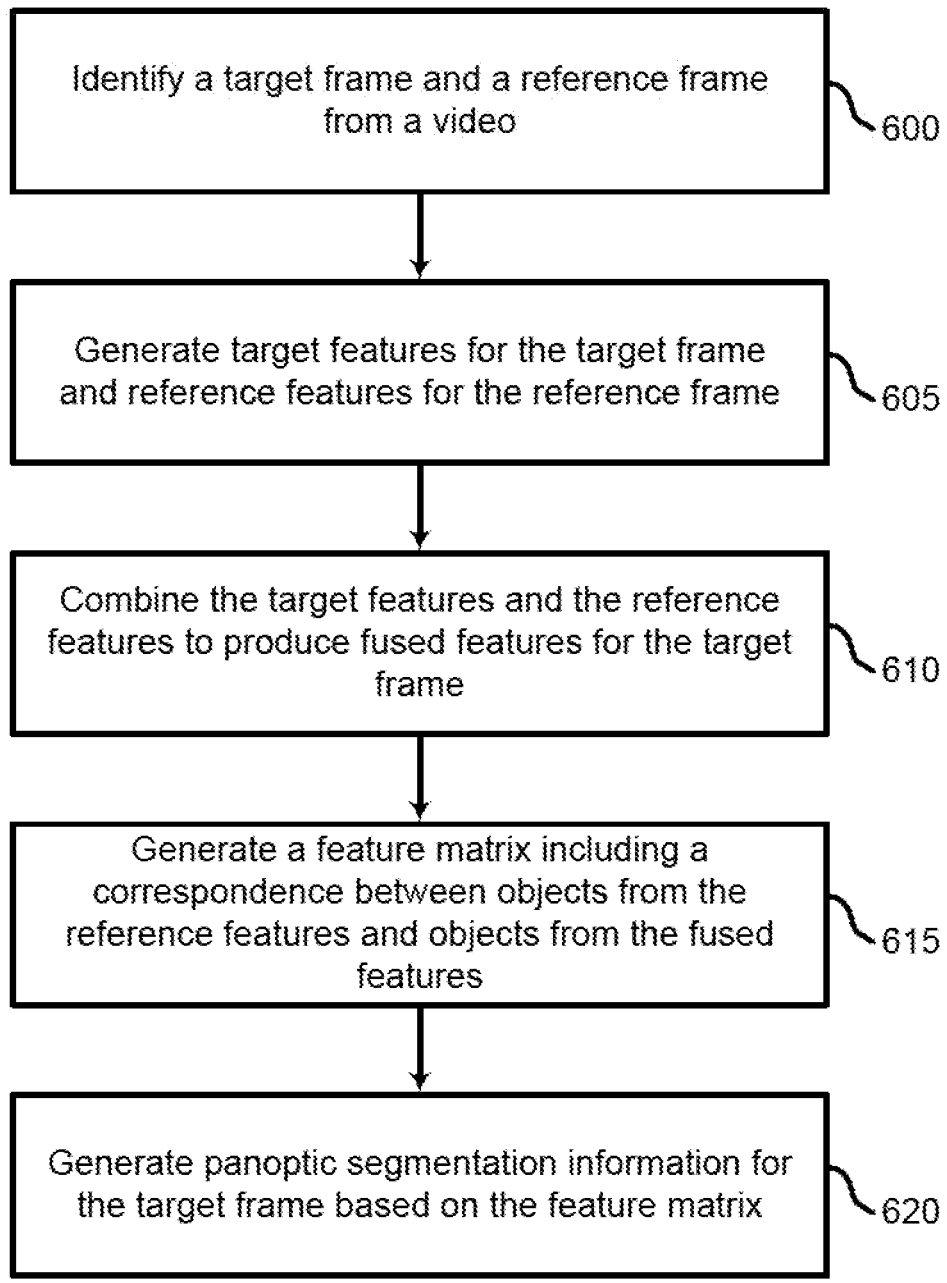
FIG. 6 shows an example of a process for video panoptic segmentation according to aspects of the present disclosure.

FIG. 6 shows an example of a process for video panoptic segmentation according to aspects of the present disclosure. In some examples, these operations may be performed by a system including a processor executing a set of codes to control functional elements of an apparatus. Additionally or alternatively, the processes may be performed using special-purpose hardware. Generally, these operations may be performed according to the methods and processes described in accordance with aspects of the present disclosure. For example, the operations may be composed of various substeps, or may be performed in conjunction with other operations described herein.

At operation 600, the system identifies a target frame and a reference frame from a video. At operation 605, the system generates target features for the target frame and reference features for the reference frame. In some cases, the operations of this step may be performed by an encoder as described with reference to FIG. 5.

For example, at each time step t, an encoder may be given a target frame $I_t$ and one or more reference frames $I_{t'}$ produces FPN features $\{p^2, p^3, p^4, p^5\}_t$ and $\{p^2, p^3, p^4, p^5\}_{t-\tau}$. The reference frame is sampled with $\tau \in \{t-5:t+5\}$. In some cases, an initial anchor frame may be processed without a reference frame. The anchor frame may either be a first frame, a last frame or a frame in the middle of a video. If the first frame is in the middle, subsequent frames may be determined before and after the anchor frame using the anchor frame as a reference (i.e., the reference frame can be either before or after the target frame in the video sequence).

At operation 610, the system combines the target features and the reference features to produce fused features for the target frame. In some cases, the operations of this step may be performed by a fusion component as described with reference to FIG. 5.

For example, at a gather step, input FPN features $\{p^2, p^3, p^4, p^5\}$ may be resized to the highest resolution, i.e., the same size as $p^2$, and element-wise summed over multiple levels to produce f. Then, the representative features are redistributed to the original features by a residual addition. In some cases, an align-and-attend step may be implemented between the gather and redistribute steps.

At operation 615, the system generates a feature matrix including a correspondence between objects from the reference features and objects from the fused features. In some cases, the operations of this step may be performed by a track head as described with reference to FIG. 5.

For example, a track head may learn an m×n feature affinity matrix A between generated n RoI proposals $\{r_1, r_2 \ldots r_n\}_t$ from $I_t$ and m RoI features $\{r_1, r_2 \ldots r_m\}_{t-\tau}$ from $I_{t-\tau}$. For each pair $\{r_{i,t}, r_{j,t-\tau}\}$, a Siamese fully-connected layer may embed them into single vectors $\{e_{i,t}, e_{j,t-\tau}\}$.

At operation 620, the system generates panoptic segmentation information for the target frame based on the feature matrix. For example, the panoptic segmentation information may include both semantic and instance annotation information for each frame (each sampled frame) of a video. In some cases, the operations of this step may be performed by a segmentation component as described with reference to FIG. 5.

Training

Figure 7:
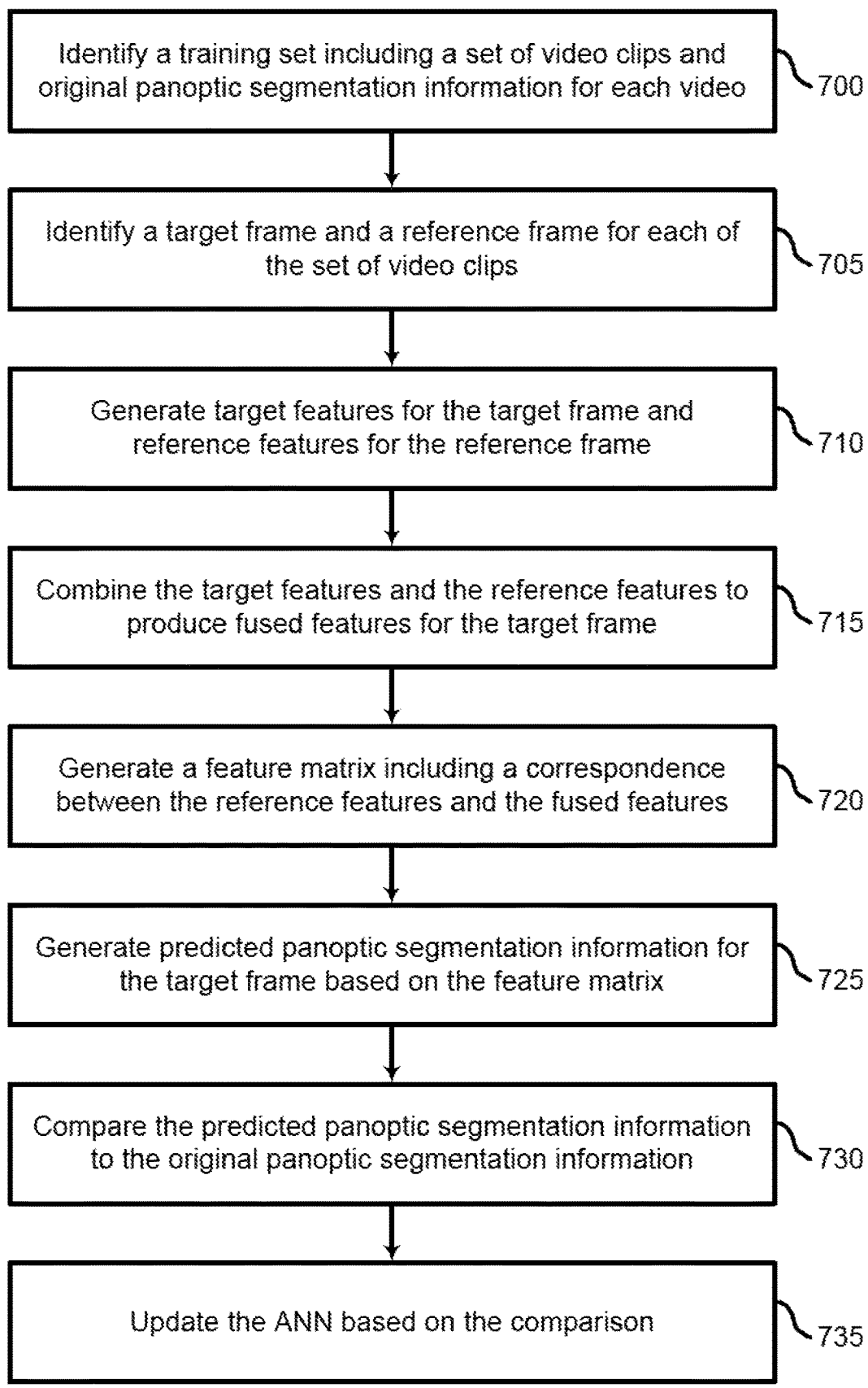
FIG. 7 shows an example of a process for training an artificial neural network (ANN) for video panoptic segmentation according to aspects of the present disclosure.

FIG. 7 shows an example of a process for training an ANN for video panoptic segmentation according to aspects of the present disclosure. In some examples, these operations may be performed by a system including a processor executing a set of codes to control functional elements of an apparatus. Additionally or alternatively, the processes may be performed using special-purpose hardware. Generally, these operations may be performed according to the methods and processes described in accordance with aspects of the present disclosure. For example, the operations may be composed of various substeps, or may be performed in conjunction with other operations described herein.

At operation 700, the system identifies a training set including a set of video clips and original panoptic segmentation information for each of the set of video clips.

Some datasets that have dense panoptic segmentation annotations include Cityscapes, ADE20k, Mapillary, and COCO. However, these datasets may not be suitable for a video panoptic segmentation task by themselves. An appropriate video panoptic segmentation dataset may include both high quality and high quantity of annotations. In addition, an appropriate dataset may be adaptable to and extensible from an image-based panoptic dataset. Seamless transfer of knowledge between image domains and video domains may also be desired. Thus, in some embodiments a datasets may be produced by reformatting the VIPER dataset and creating new video panoptic annotations based on the Cityscapes dataset, respectively.

To maximize both quality and quantity of available annotations for video panoptic segmentation tasks, one embodiment of the present disclosure implements the synthetic VIPER dataset. In one example, the VIPER dataset may include pixel-wise annotations of semantic and instance segmentations for 10 thing and 13 stuff classes on 254K frames of ego-centric driving scenes at 1080×1920 resolution. Embodiments of the present disclosure modify the forgoing annotations into VPS format and creates metadata in the COCO style.

One embodiment of the present disclosure builds a dataset based upon the Cityscapes dataset together with COCO. In some cases, the described dataset includes image-level annotated frames of the ego-centric driving scenarios, where each labeled frame may be the 20$^{th}$ frame in a 30 frame video snippet. For example, 2965, 500, and 1525 sampled images may be paired with dense panoptic annotations for 8 thing and 11 stuff classes for training, validation, and testing, respectively.

Embodiments of the present disclosure select the validation set to build the described video-level extended dataset. In one example, the described method samples every five frames from each of the 500 videos, and then asks human annotators to carefully label each pixel with all 19 classes, and assigns temporally consistent instance IDs to the thing objects. In one example, the described dataset may provide dense panoptic annotations for 3000 frames at 1024×2048 resolution with instance ID association across frames within each video. The described dataset may be referred to as the Cityscapes-VPS. The described dataset may be applied to vision tasks such as video panoptic segmentation, video instance segmentation, and video semantic segmentation.

At operation 705, the system identifies a target frame and a reference frame for each of the set of video clips. At operation 710, the system generates target features for the target frame and reference features for the reference frame. In some cases, the operations of this step may be performed by an encoder as described with reference to FIG. 5.

At operation 715, the system combines the target features and the reference features to produce fused features for the target frame. In some cases, the operations of this step may be performed by a fusion component as described with reference to FIG. 5. At operation 720, the system generates a feature matrix including a correspondence between objects from the reference features and objects from the fused features. In some cases, the operations of this step may be performed by a track head as described with reference to FIG. 5.

At operation 725, the system generates predicted panoptic segmentation information for the target frame based on the feature matrix. In some cases, the operations of this step may be performed by a segmentation component as described with reference to FIG. 5.

The described network may process each frame sequentially in an online fashion. For each frame, the described network may generate a set of instance hypotheses. As a mask pruning process, the described network may perform the class-agnostic non-maximum suppression with the box IoU threshold as 0.5 to filter out some redundant boxes. Then, the remaining boxes may be sorted by the predicted class probabilities and are kept if the probability is larger than 0.6. For the first frame of a video sequence, instance IDs are assigned according to the order of the probability. For all other frames, the remaining boxes after pruning are matched to identified instances from previous frames, and are assigned instance IDs accordingly. After processing all frames, the described network may produce a sequence of panoptic segmentation, each pixel may contain a unique category label and an instance label throughout the sequence.

At operation 730, the system compares the predicted panoptic segmentation information to the original panoptic segmentation information. At operation 735, the system updates the ANN based on the comparison.

The described network may be implemented in PyTorch with the MMDetection toolbox. In one example, a distributed training architecture with 8 GPUs is used. Each mini-batch may have 1 image per GPU. Ground truth box of a reference frame is used to train the track head. In one embodiment, the described network may crop random 800× 1600 pixels out of 1024×2048 Cityscapes and 1080×1920 VIPER images after randomly scaling each frame by 0.8 to 1.25×. Due to high resolution of images, the described network may down-sample the logits for the semantic head and the panoptic head to 200×400 pixels.

Beside RPN losses, the described network may contain multiple 6 task-related loss functions, including a bounding box head (for classification and bounding-box loss), a mask head, a semantic head, a panoptic head, and a track head. All loss weights may be set to 1.0 to make their scales roughly on the same order of magnitude. In one example, a learning rate may be set to 0.005 and weight decay may be set to 0.0001 for all datasets. For both the Cityscapes and the Cityscapes-VPS, 144 epochs may be trained and learning rate decay applied at 96 and 128 epochs. For the VIPER, 12 epochs may be trained and learning rate decay is applied at 8 and 11 epochs.

Thus, the present disclosure describes a video panoptic segmentation task that unifies semantic segmentation and instance segmentation tasks in concert. Embodiments herein disclose datasets for video panoptic segmentation tasks. In one embodiment, a synthetic VIPER dataset is adapted into a VPS format, which may provide maximal quantity and quality of panoptic annotations. In one embodiment, a video panoptic segmentation benchmark dataset is created, which extends the image-level Cityscapes dataset. A video panoptic segmentation network is described herein that combines a temporal feature fusion module and an object tracking branch with a single-frame panoptic segmentation network. The results of various embodiments may be evaluated using a VPQ evaluation metric.

Accordingly, the present disclosure includes the following embodiments.

A method for video panoptic segmentation is described. Embodiments of the method may include identifying a target frame and a reference frame from a video, generating target features for the target frame and reference features for the reference frame, combining the target features and the reference features to produce fused features for the target frame, generating a feature matrix comprising a correspondence between objects from the reference features and objects from the fused features, and generating panoptic segmentation information for the target frame based on the feature matrix.

An apparatus for video panoptic segmentation is described. The apparatus may include a processor, memory in electronic communication with the processor, and instructions stored in the memory. The instructions may be operable to cause the processor to identify a target frame and a reference frame from a video, generate target features for the target frame and reference features for the reference frame, combine the target features and the reference features to produce fused features for the target frame, generate a feature matrix comprising a correspondence between objects from the reference features and objects from the fused features, and generate panoptic segmentation information for the target frame based on the feature matrix.

A non-transitory computer readable medium storing code for video panoptic segmentation is described. In some examples, the code comprises instructions executable by a processor to: identify a target frame and a reference frame from a video, generate target features for the target frame and reference features for the reference frame, combine the target features and the reference features to produce fused features for the target frame, generate a feature matrix comprising a correspondence between objects from the reference features and objects from the fused features, and generate panoptic segmentation information for the target frame based on the feature matrix.

Some examples of the method, apparatus, and non-transitory computer readable medium described above may further include combining a plurality of input features to produce the target features, wherein each of the plurality of input features has a different resolution, and wherein the target features have a same resolution as the target frame. Some examples of the method, apparatus, and non-transitory computer readable medium described above may further include aligning the reference features with the target features, wherein the fused features are combined based on the aligned reference features. In some examples, combining the target features and the reference features comprises applying a spatial-temporal attention module to the target features and the reference features.

Some examples of the method, apparatus, and non-transitory computer readable medium described above may further include identifying an object order for the objects from the fused features based on the feature matrix, wherein the panoptic segmentation is based at least in part on the object order. Some examples of the method, apparatus, and non-transitory computer readable medium described above may further include identifying a bounding box for each of the objects from the fused features.

Some examples of the method, apparatus, and non-transitory computer readable medium described above may further include classifying each of the objects from the fused features. Some examples of the method, apparatus, and non-transitory computer readable medium described above may further include generating a pixel mask for each of the objects from the fused features. Some examples of the method, apparatus, and non-transitory computer readable medium described above may further include classifying each pixel of the target frame based on the fused features.

In some examples, the panoptic segmentation information comprises classification information and instance information for each pixel of the target frame. In some examples, the panoptic segmentation information is generated based on an object order for the objects from the fused features, an object classification for each of the objects from the fused features, a pixel mask for each of the objects from the fused features, and a pixel classification for each pixel of the target frame.

Some examples of the method, apparatus, and non-transitory computer readable medium described above may further include sampling a plurality of frames from the video. Some examples may further include generating the panoptic segmentation information for each of the plurality of frames.

A method for video panoptic segmentation is described. Embodiments of the method may include identifying a training set comprising a plurality of video clips and original panoptic segmentation information for each of the plurality of video clips, identifying a target frame and a reference frame for each of the plurality of video clips, generating target features for the target frame and reference features for the reference frame, combining the target features and the reference features to produce fused features for the target frame, generating a feature matrix comprising a correspondence between objects from the reference features and objects from the fused features, generating predicted panoptic segmentation information for the target frame based on the feature matrix, comparing the predicted panoptic segmentation information to the original panoptic segmentation information, and updating the ANN based on the comparison.

An apparatus for video panoptic segmentation is described. The apparatus may include a processor, memory in electronic communication with the processor, and instructions stored in the memory. The instructions may be operable to cause the processor to identify a training set comprising a plurality of video clips and original panoptic segmentation information for each of the plurality of video clips, identify a target frame and a reference frame for each of the plurality of video clips, generate target features for the target frame and reference features for the reference frame, combine the target features and the reference features to produce fused features for the target frame, generate a feature matrix comprising a correspondence between objects from the reference features and objects from the fused features, generate predicted panoptic segmentation information for the target frame based on the feature matrix, compare the predicted panoptic segmentation information to the original panoptic segmentation information, and update the ANN based on the comparison.

A non-transitory computer readable medium storing code for video panoptic segmentation is described. In some examples, the code comprises instructions executable by a processor to: identify a training set comprising a plurality of video clips and original panoptic segmentation information for each of the plurality of video clips, identify a target frame and a reference frame for each of the plurality of video clips, generate target features for the target frame and reference features for the reference frame, combine the target features and the reference features to produce fused features for the target frame, generate a feature matrix comprising a correspondence between objects from the reference features and objects from the fused features, generate predicted panoptic segmentation information for the target frame based on the feature matrix, compare the predicted panoptic segmentation information to the original panoptic segmentation information, and update the ANN based on the comparison.

Some examples of the method, apparatus, and non-transitory computer readable medium described above may further include sampling a plurality of frames from each of the plurality of video clips. Some examples may further include generating the panoptic segmentation information for each of the plurality of frames.

In some examples, the predicted panoptic segmentation information is generated based on an object order for the objects from the fused features, an object classification for each of the objects from the fused features, a pixel mask for each of the objects from the fused features, and a pixel classification for each pixel of the target frame. Some examples of the method, apparatus, and non-transitory computer readable medium described above may further include applying a spatial-temporal attention module to the target features and the reference features.

An apparatus for video panoptic segmentation is described. Embodiments of the apparatus may include an encoder configured to generate target features for a target frame and reference features for a reference frame of a video, a fusion component configured to combine the target features and the reference features to produce fused features for the target frame, a track head configured to generate a feature matrix comprising a correspondence between objects from the reference features and objects from the fused features, a semantic head configured to classify each pixel of the target frame based on the fused features, and a segmentation component configured to generate panoptic segmentation information for the target frame based on the feature matrix and the classification of each pixel of the target frame.

A method of manufacturing an apparatus for video panoptic segmentation is described. The method may include providing an encoder configured to generate target features for a target frame and reference features for a reference frame of a video, providing a fusion component configured to combine the target features and the reference features to produce fused features for the target frame, providing a track head configured to generate a feature matrix comprising a correspondence between objects from the reference features and objects from the fused features, providing a semantic head configured to classify each pixel of the target frame based on the fused features, and providing a segmentation component configured to generate panoptic segmentation information for the target frame based on the feature matrix and the classification of each pixel of the target frame.

Some examples of the apparatus and method described above may further include a bounding box head configured to identify a bounding box for each of the objects from the fused features. Some examples of the apparatus and method described above may further include a mask head configured to generate a pixel mask for each of the objects from the fused features. In some examples, the track head is further configured to classify each object from the fused features.

The description and drawings described herein represent example configurations and do not represent all the implementations within the scope of the claims. For example, the operations and steps may be rearranged, combined or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein, but is to be accorded the broadest scope consistent with the principles and novel features disclosed herein.

The described methods may be implemented or performed by devices that include a general-purpose processor, a digital signal processor (DSP), an application specific integrated circuit (ASIC), a field programmable gate array (FPGA) or other programmable logic device, discrete gate or transistor logic, discrete hardware components, or any combination thereof. A general-purpose processor may be a microprocessor, a conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be implemented in hardware or software and may be executed by a processor, firmware, or any combination thereof. If implemented in software executed by a processor, the functions may be stored in the form of instructions or code on a computer-readable medium.

Computer-readable media includes both non-transitory computer storage media and communication media including any medium that facilitates transfer of code or data. A non-transitory storage medium may be any available medium that can be accessed by a computer. For example, non-transitory computer-readable media can comprise random access memory (RAM), read-only memory (ROM), electrically erasable programmable read-only memory (EEPROM), compact disk (CD) or other optical disk storage, magnetic disk storage, or any other non-transitory medium for carrying or storing data or code.

Also, connecting components may be properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

In this disclosure and the following claims, the word "or" indicates an inclusive list such that, for example, the list of X, Y, or Z means X or Y or Z or XY or XZ or YZ or XYZ. Also the phrase "based on" is not used to represent a closed set of conditions. For example, a step that is described as "based on condition A" may be based on both condition A and condition B. In other words, the phrase "based on" shall be construed to mean "based at least in part on." Also, the words "a" or "an" indicate "at least one."

What is claimed is:

1. A method for image processing, comprising:
identifying a target frame from a first time in a video and a reference frame from a second time of the video, wherein the first time is different than the second time;
generating target features for the target frame from the first time and reference features for the reference frame from the second time;
combining the target features for the target frame from the first time and the reference features for the reference frame from the second time to produce fused features for the target frame;
generating a feature matrix comprising a correspondence between objects from the reference features and objects from the fused features; and
generating panoptic segmentation information for the target frame based on the feature matrix.

2. The method of claim 1, further comprising:
combining a plurality of input features to produce the target features, wherein each of the plurality of input features has a different resolution, and wherein the target features have a same resolution as the target frame.

3. The method of claim 1, further comprising:
aligning the reference features with the target features, wherein the fused features are combined based on the aligned reference features.

4. The method of claim 1, wherein:
the combining of the target features and the reference features comprises applying a spatial-temporal attention module to the target features and the reference features.

5. The method of claim 1, further comprising:
identifying an object order for the objects from the fused features based on the feature matrix, wherein the panoptic segmentation information is based at least in part on the object order.

6. The method of claim 1, further comprising:
identifying a bounding box for each of the objects from the fused features.

7. The method of claim 1, further comprising:
classifying each of the objects from the fused features.

8. The method of claim 1, further comprising:
generating a pixel mask for each of the objects from the fused features.

9. The method of claim 1, further comprising:
classifying each pixel of the target frame based on the fused features.

10. The method of claim 1, wherein:
the panoptic segmentation information comprises classification information and instance information for each pixel of the target frame.

11. The method of claim 1, wherein:
the panoptic segmentation information is generated based on an object order for the objects from the fused features, an object classification for each of the objects from the fused features, a pixel mask for each of the objects from the fused features, and a pixel classification for each pixel of the target frame.

12. The method of claim 1, further comprising:
sampling a plurality of frames from the video; and
generating the panoptic segmentation information for each of the plurality of frames.

13. A method for training an artificial neural network (ANN) for video segmentation, comprising:
- identifying a training set comprising a plurality of video clips and original panoptic segmentation information for each of the plurality of video clips;
- identifying a target frame from a first time and a reference frame from a second time for each of the plurality of video clips, wherein the first time is different than the second time;
- generating target features for the target frame from the first time and reference features for the reference frame from the second time;
- combining the target features for the target frame from the first time and the reference features for the reference frame from the second time to produce fused features for the target frame;
- generating a feature matrix comprising a correspondence between objects from the reference features and objects from the fused features;
- generating predicted panoptic segmentation information for the target frame based on the feature matrix;
- comparing the predicted panoptic segmentation information to the original panoptic segmentation information; and
- updating the ANN based on the comparison.

14. The method of claim 13, further comprising:
- sampling a plurality of frames from each of the plurality of video clips; and
- generating panoptic segmentation information for each of the plurality of frames.

15. The method of claim 13, wherein:
- the predicted panoptic segmentation information is generated based on an object order for the objects from the fused features, an object classification for each of the objects from the fused features, a pixel mask for each of the objects from the fused features, and a pixel classification for each pixel of the target frame.

16. The method of claim 13, further comprising:
applying a spatial-temporal attention module to the target features and the reference features.

17. An apparatus for image processing, comprising:
- an encoder configured to generate target features for a target frame from a first time in a video and reference features for a reference frame from a second time of the video, wherein the first time is different than the second time;
- a fusion component configured to combine the target features for the target frame from the first time and the reference features for the reference frame from the second time to produce fused features for the target frame, wherein the fusion component comprises a spatial-temporal attention module configured to combine the target features and the reference features;
- a track head configured to generate a feature matrix comprising a correspondence between objects from the reference features and objects from the fused features;
- a semantic head configured to classify each pixel of the target frame based on the fused features; and
- a segmentation component configured to generate panoptic segmentation information for the target frame based on the feature matrix and the classification of each pixel of the target frame.

18. The apparatus of claim 17, further comprising:
a bounding box head configured to identify a bounding box for each of the objects from the fused features.

19. The apparatus of claim 17, further comprising:
a mask head configured to generate a pixel mask for each of the objects from the fused features.

20. The apparatus of claim 17, wherein:
the track head is further configured to classify each object from the fused features.

* * * * *